(12) United States Patent
Giovannoni

(10) Patent No.: US 7,124,980 B2
(45) Date of Patent: Oct. 24, 2006

(54) WIRE SPOOL GUIDE ASSEMBLY

(76) Inventor: James Giovannoni, 2089 Princeton Ave., Stockton, CA (US) 95204

( * ) Notice: Subject to any disclaimer, the term of this patent is extended or adjusted under 35 U.S.C. 154(b) by 246 days.

(21) Appl. No.: 10/921,236

(22) Filed: Aug. 19, 2004

(65) Prior Publication Data
US 2006/0038053 A1    Feb. 23, 2006

(51) Int. Cl.
B65H 75/20 (2006.01)
B65H 49/18 (2006.01)

(52) U.S. Cl. .................. 242/557; 242/566; 242/594.4; 242/615.3; 242/137.1; 242/125

(58) Field of Classification Search ............. 242/557, 242/566, 594.4, 598.5, 615.3, 140, 125, 128, 242/137.1, 397, 397.5, 615.1, 157 R, 129.62, 242/129.72; 248/82
See application file for complete search history.

(56) References Cited

U.S. PATENT DOCUMENTS

| 986,020 | A |   | 3/1911  | Mills |
|---|---|---|---|---|
| 1,834,159 | A |   | 12/1931 | King, Jr. et al. |
| 2,022,409 | A |   | 11/1935 | De Mott |
| 2,437,630 | A |   | 3/1948  | Williams et al. |
| 2,828,928 | A | * | 4/1958  | Kollisch ............ 242/137.1 |
| 2,935,274 | A |   | 5/1960  | Pearson |
| 3,010,674 | A |   | 11/1961 | Dull et al. |
| 3,212,729 | A | * | 10/1965 | Putnam ............. 242/129 |
| 3,381,925 | A |   | 5/1968  | Higuchi |
| 3,425,647 | A |   | 2/1969  | Kovaleski et al. |
| 3,469,801 | A |   | 9/1969  | Hauck et al. |
| 3,692,254 | A |   | 9/1972  | Ebert et al. |
| 3,815,844 | A |   | 6/1974  | Wright et al. |
| 4,074,871 | A |   | 2/1978  | Stotler |
| 4,143,832 | A |   | 3/1979  | Platt |
| 4,570,987 | A | * | 2/1986  | Wong et al. ............ 294/1.1 |
| 4,641,986 | A | * | 2/1987  | Tsui et al. ............. 403/164 |
| 4,705,422 | A | * | 11/1987 | Tsui et al. ............. 403/60 |
| 4,785,758 | A | * | 11/1988 | Eichelberger, Sr. ......... 114/299 |
| 5,007,597 | A |   | 4/1991  | Jones |
| 5,028,013 | A |   | 7/1991  | Anseel |
| 5,516,059 | A |   | 5/1996  | Gudgeon et al. |
| 6,572,483 | B1 | * | 6/2003 | Hoffman ............. 472/118 |
| 6,616,090 | B1 |   | 9/2003 | Stamps |
| 6,834,827 | B1 | * | 12/2004 | Burkitt ............... 242/557 |
| 6,943,291 | B1 | * | 9/2005 | Brittain et al. ........... 174/42 |

FOREIGN PATENT DOCUMENTS

| EP | 0 372 626 | 6/1990 |
|---|---|---|
| GB | 2 101 085 | 1/1983 |
| GB | 2 161 506 | 1/1986 |

* cited by examiner

Primary Examiner—William A. Rivera
Assistant Examiner—Sang Kim
(74) Attorney, Agent, or Firm—Richard C. Litman

(57) ABSTRACT

The wire spool guide assembly is a conduit through which wire is dispensed in a controlled and orderly manner. The assembly has at least one wire spool guide, a handle bar and a spindle. The spindle may be a single spindle or part of a wire spool cart. The spindle is used to hold wire spools and the handle bar. The handle bar serves to hold the guide. The guide includes an eyebolt rotatably mounted to a support frame via a ball bearing. The eyebolt guides wire as it is dispensed from the spool acquiescing to the direction of the user's pull. Friction, created as wire is pulled through the eyebolt, slows the speed at which the spool rotates on the spindle. The frame of the guide, however, is fixed on the handle bar by a fastener disposed at a bottom end of the guide.

19 Claims, 3 Drawing Sheets

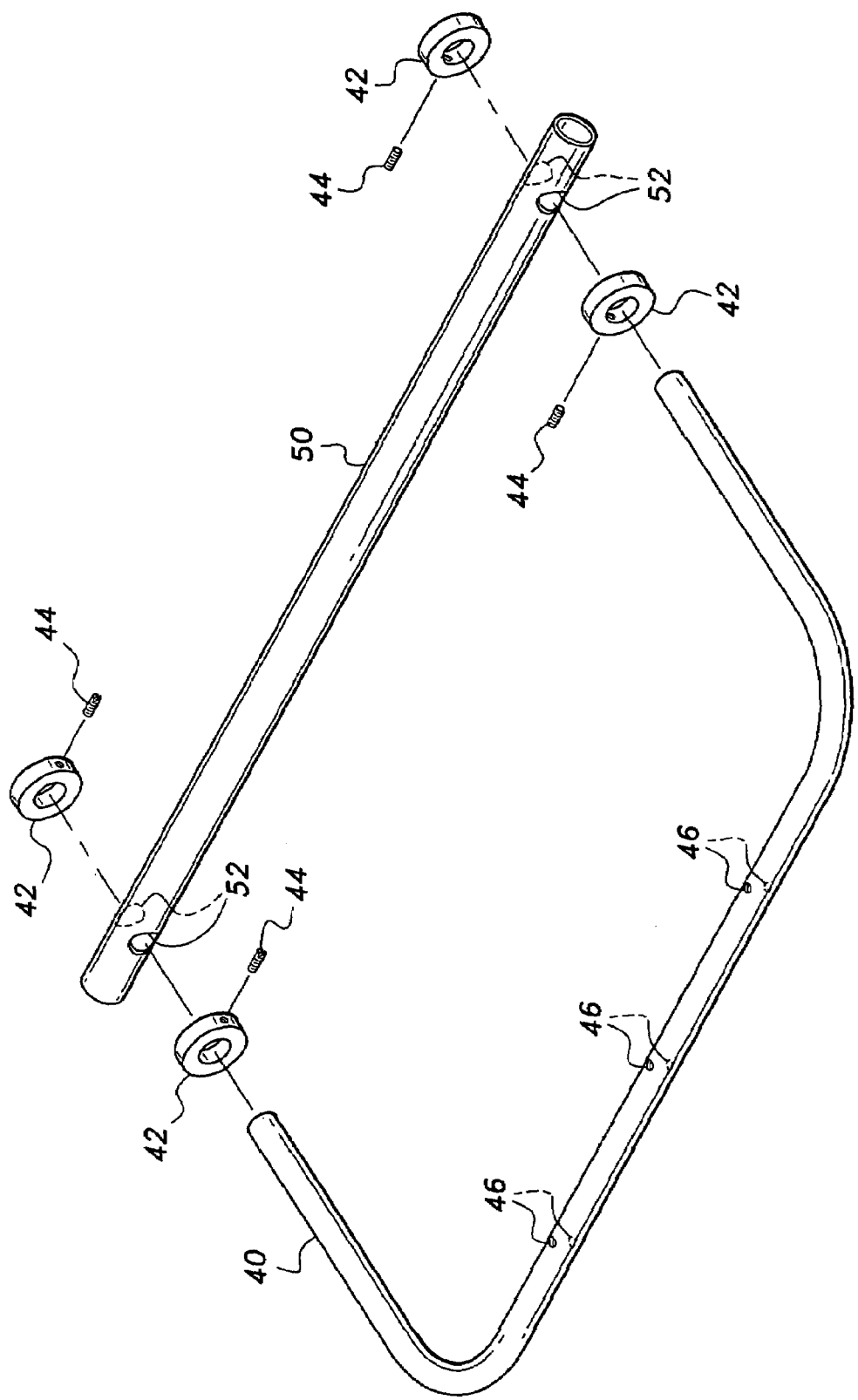

WIRE SPOOL GUIDE ASSEMBLY

BACKGROUND OF THE INVENTION

1. Field of the Invention

The present invention relates to wire guides, and more particularly to a rotatable wire guide, for use with a spool of wire, that adjusts to the direction in which wire is pulled from a spool.

2. Description of the Related Art

Wire management is a common problem for electricians especially when wiring houses and buildings. Normally more than one person is needed on a wiring job to help keep spooled wire from entangling. Spools of wire are tethered to a spindle or rod to prevent the spools from becoming mobile as the wire is pulled off the spool. However, the spindle does not prevent wires from becoming tangled. A device is desired that will allow wire to be dispensed in any direction and in an orderly manner without becoming entangled.

U.S. Pat. No. 986,020, issued to Mills on Mar. 7, 1911, describes a wire feeder. The feeder has an arm that rotates between two cones of wire to dispense wire through a tube. The arm uses guide wheels to properly direct the wire from one of the cones to the tube.

U.S. Pat. No. 1,834,159, issued to King, Jr. et al on Dec. 1, 1931, describes a wire holder. The holder comprises of a frame that surrounds a coil of wire and a hub that is disposed on a post on the frame and an upwardly flared bell-shaped wire guide supported by the hub. Pulling the wire through the wire guide dispenses the coiled wire.

U.S. Pat. No. 2,022,409, issued to Mott on Nov. 26, 1935, describes a twine dispenser. The dispenser comprises of a casing that holds a roll of twine around a spindle. A strand of twine exits the casing through a guide aperture found in a hinged lid of the casing.

U.S. Pat. No. 2,437,630, issued to Williams et al. on Mar. 9, 1948, describes a wire pay-off mechanism. The mechanism uses a motor driven wind-up reel to unwind and draw wire from a coil through two wire guides onto the reel.

U.S. Pat. No. 2,935,274, issued to Pearson on May 3, 1960, describes a controlled wire reel pay off device. The device has at least one radial and outward projecting annular wire-retaining end flange to allow the wire to be payed-off axially to the reel. Guides are disposed concentrically on a flange of the reel circumjacent a wire retaining end flange on the end of the reel from which the wire is being payed-off.

U.S. Pat. No. 3,010,674, issued to Dull et al. on Nov. 28, 1961, describes a wire take-off device. The wire is coiled on a rack that is mounted on a support. The take-off device comprises a platform having a stationary support for the rack, a stand having a transversely extending arm that holds a member through which wire is dispensed from the coil.

U.S. Pat. No. 3,381,925, issued to Higuchi on May 7, 1968, describes a tiedown fitting for ship decks. The device comprises a shank member having an upper end with a ring for connection of a tiedown means and a lower end that is inserted through an opening on a floor. A spring biased washer is slidably mounted on the shank member to engage the upper surface of the floor panel.

U.S. Pat. No. 3,425,647, issued to Kovaleski et al. on Feb. 4, 1969, describes a wire-take off device. The device is in the form of a turnable wheel rotatably mounted coaxially with and flat against the end of a spool. Wire is dispensed across the side of the wheel and goes into a guide button, which is coaxial with the spool and wheel. A plurality of tines extends from the guide button to control the movement of the wire as it is dispensed.

U.S. Pat. No. 3,469,801, issued to Hauck et al. on Sep. 30, 1969, describes a device for unwinding wire from a reel. The device uses a motor driven drive reel to pull wire from a reel. A bracket is disposed between the drive reel and a utilization device through which wire passes from the drive reel to the utilization device.

U.S. Pat. No. 3,692,254, issued to Ebert et al. on Sep. 19, 1972, describes a strand guiding apparatus. The apparatus is a vertical pay off machine that withdraws a strand from a horizontally disposed coil into a machine. The wire is stretched past guide means used to avoid formation of kinks in the drawn strand.

U.S. Pat. No. 3,815,844, issued to Wright et al. on Jun. 11, 1974, describes a method and apparatus for unwinding coiled material. The apparatus comprises a rotatable platform that supports a coil of material, a drive means that rotates the platform. A guide mounted on an arm receives and dispenses the coiled material. The arm moves from a first to a second position based on the outfeed of the wire.

U.S. Pat. No. 4,074,871, issued to Stotler on Feb. 21, 1978, describes a method and apparatus for handling strands. The invention relates to roving or beaming operation in which a strand is produced by gathering strands from a plurality of feeder packages. A sensing means senses the passage and cessation of the strand from the feeder package and adds a strand from an auxiliary feeder package.

U.S. Pat. No. 4,143,832, issued to Platt on Mar. 13, 1979, describes a thread dispenser. The dispenser generally comprises a mounting means for a ball of thread, an axle on the mounting means disposed between two arms and a thread guide fairlead disposed on a support shaft; the shaft is then mounted to the axle.

U.S. Pat. No. 5,007,597, issued to Jones on Apr. 16, 1991, describes an automatic dispenser for elongated flexible coiled elements. The dispenser has a motor to rotate a spool and control the actuation and speed of the dispensation of the spool and two guides to help dispense the wire. The first guide rotates about an axis of rotation of a carrier to easily pull off the wire from the spool. The second guide is mounted on a frame and is a distance from the first guide. The guides cooperate to adjust the speed at which the motor dispenses the wire.

European Patent Number 372,626, published on Jun. 13, 1990 and U.S. Pat. No. 5,028,013, issued to Anseel on Jul. 2, 1991, describes a wire take-off apparatus. The apparatus rests on a flange of a spool and consists of two annular elements used to guide and dispense wire from a spool.

U.S. Pat. No. 5,516,059, issued to Gudgeon et al. on May 14, 1996, describes an electrical wire spool guide. The guide comprises two side plates that are oriented in the same plane having adjustable length guide bars between the plates at a first and second end. The plates can be disposed on a spindle to surround the outer portion of flanges on a spool. The adjustable length guide bars guide wire as it is dispensed from the spool and prevents wire from tangling.

U.S. Pat. No. 6,616,090, issued to Stamps on Sep. 9, 2003 describes a wire supply apparatus for feeding wire. The assembly comprises a wire supply control assembly and a wire feeder arm assembly. The wire supply control assembly holds a coiled wire and possesses an arm having routing rings. The wire feeder arm assembly also possesses retaining rings and is adjustable. The wire may be directed through both arms to be ready for use.

British Patent Number 2,101,085, published on Jan. 12, 1983, describes a filament pay off device. The device comprises two flanges disposed on a spool flange that sandwiches an elastic band. A wire from a spool is threaded over one flange under the elastic band and over the other flange. The elastic band keeps the wire close to the flanges and brakes the wire due to the action of the band.

British Patent Number 2,161,506, published on Jan. 15, 1986, describes a pay-off apparatus. The apparatus comprises a frame to hold a bobbin, a spinner disc mounted to rotate on one end of the bobbin, radiating bristles mounted on the axis and a guide disposed through the disc. The wire passes from the bobbin through the guide up to a die unit disposed on the frame of the apparatus that creates tension on the wire being pulled from the bobbin.

None of the above inventions and patents, taken either singly or in combination, is seen to describe the instant invention as claimed. Thus a wire spool guide assembly solving the aforementioned problems is desired.

SUMMARY OF THE INVENTION

The wire spool guide assembly is a conduit through which wire is dispensed in a controlled and orderly manner. The assembly includes at least one wire spool guide, a handle bar and a spindle. The spindle may be either a lone spindle or several spindles forming a wire spool cart used to hold wire spools and the handle bar. The handle bar is inserted into the ends of the spindle and locked in place using setscrew collars.

The handle bar serves to mount the wire spool guide(s) The guides are positioned on the handle bar to be directly in front of each spool on the spindle. The guide has an eyebolt, a ball bearing, and a support frame. The eyebolt is rotatably mounted to the support frame via the ball bearing, allowing the eyebolt to rotate about a vertical axis. Wire is threaded through the eyebolt to serves as the conduit through which wire is dispensed. Friction is created as wire is pulled through the eyebolt that slows the speed at which the spool rotates on the spindle. The guide nevertheless acquiesces to the direction of a user's pull by the eyebolt being able to rotate about the ball bearing. The frame of the guide, however, is fixed on the handle bar by a fastener disposed at a bottom end of the guide.

BRIEF DESCRIPTION OF THE DRAWINGS

FIG. 3 is an exploded view of a handle bar of the wire spool assembly according to the present invention.

Similar reference characters denote corresponding features consistently throughout the attached drawings.

DETAILED DESCRIPTION OF THE PREFERRED EMBODIMENTS

Figure 1:
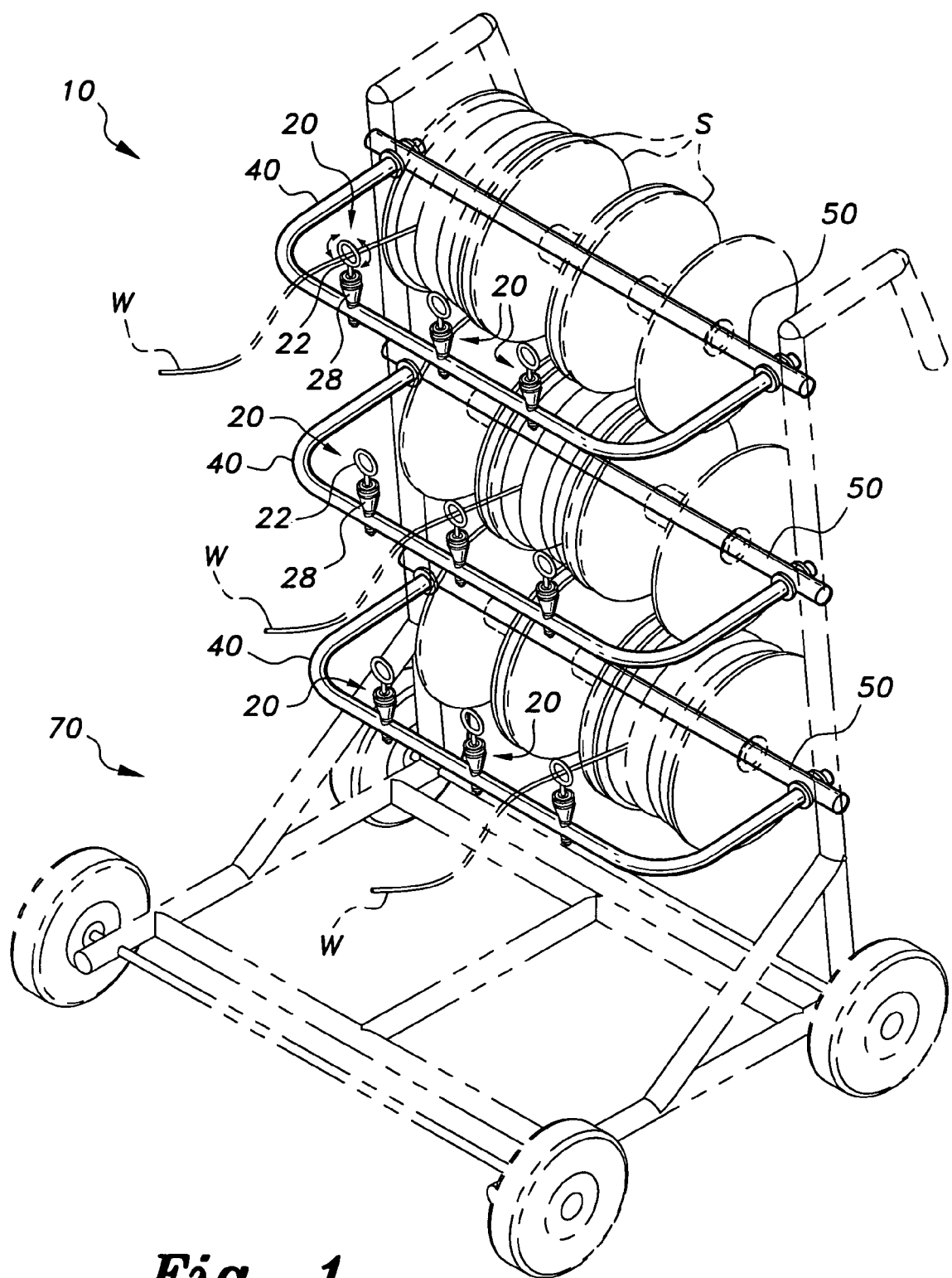
FIG. 1 is a perspective view of a wire spool guide assembly according to the present invention.

A wire spool guide assembly is designated as 10 in the figures. The wire spool guide assembly 10 is a conduit through which wire may be dispensed in a controlled and orderly manner. As shown in FIG. 1, the assembly 10 includes a wire spool cart 70 having at least one spindle 50 on which spools S of wire W are disposed. The cart 70 may be any commercially sold wire spool cart used to retain spools S for wiring jobs. The spindle 50 holds the spools S of wire and serves as a mounting point for a handle bar 40.

FIG. 3 shows the handle bar 40 structure. At each end of the spindle 50 are holes 52 through which ends of the handle bar 40 are inserted. Once the ends of the handle bar 40 are inserted through the holes 52, setscrew collars 42 are used to secure the handle bar 40 to the spindle 50. The setscrew collars 42 are, preferably, one-piece shaft collars that use at least one set screw 44 to tighten the collar 42 to the handle bar 40. However other types of collars or clamps can be used to fix the handle bar 40 in place.

The setscrew collars 42 are placed on either side of the spindle 50; one pair is placed on the side of the spindle 50 that faces the handle bar 40, and the second pair is placed on the side of the spindle 50 that faces away from the handle bar 40. Once the handle bar 40 is inserted through holes 52 the collars 42 are fastened in place. The handle bar 40 and the spindle 50 may be made of electric metallic tubing. The handle bar 40 mounts to any spindle 50 on any type of cart 70. Therefore the handle bar 40 can be made in different shapes and dimensions to fit on any spindle on any sort of cart. The handle bar 40 may be any width but is preferably ⅜" wide. In some embodiments the positioning of the handle bar 40 on the spindle 50 may allow the bar 40 to move slightly up and slightly down based on which direction the wire W is being pulled in.

Figure 2:
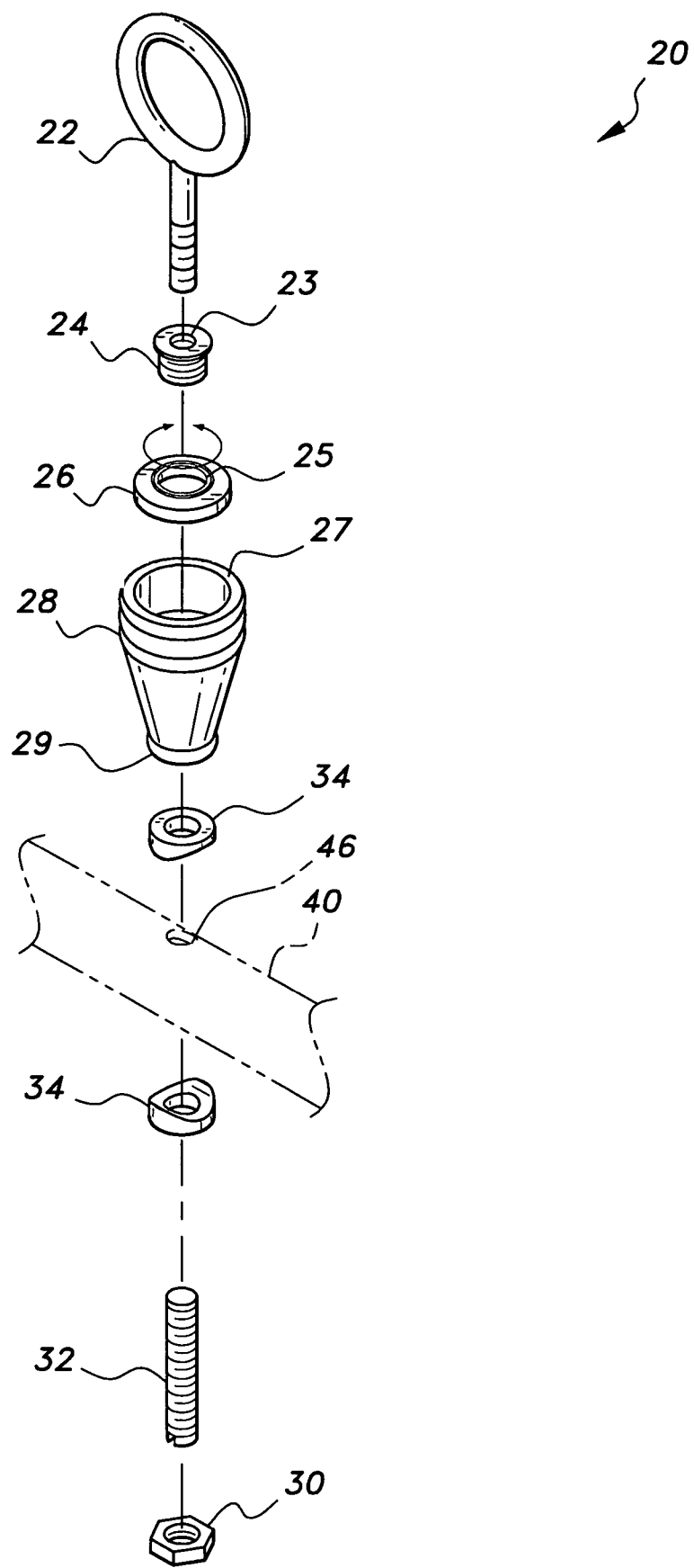
FIG. 2 is an exploded view of a wire spool guide of the wire spool assembly according to the present invention.

Referring now to FIG. 2 in conjunction with FIG. 3, the guide 20 is secured to the handle bar 40 through a hole 46. The hole 46 can be about ¼" wide. The guide 20 includes a support frame 28 having a top end 27 and a bottom end 29, a ball bearing 26 having a central hole 25, a sleeve 24 having a threaded central opening 23, and an eyebolt 22. The support frame 28 is shown to be cone-shaped with the top end 27 being dimensioned and configured to receive the ball bearing 26. The ball bearing 26 then receives the sleeve 24 through the central hole 25.

The sleeve 24 is a mounting device for the eyebolt 22. The sleeve 24 has a central shaft with a top end and a bottom end. A flat annular lip extends perpendicularly from the top end of the shaft. The shaft is threaded on the inside and smooth on the outside. The lip rests on the side of the ball bearing 26 that faces the eyebolt 22 to help keep the sleeve 24 from sliding through the central hole 25 of the ball bearing 26.

The threaded inner shaft of the sleeve 24 is dimensioned and configured to receive the eyebolt 22. The eyebolt 22 comprises a shaft having a first end and a second end. A circular member is disposed at the first end of the eyebolt 22 and the second end of the eyebolt 22 is threaded. The threaded portion of the shaft of the eyebolt 22 is twisted into the threaded inner portion of the sleeve 24 to secure the eyebolt 22 in place.

The support frame 28 has a fastener mechanism 34, 32, 30 disposed at the bottom end 29 of the support frame 28. The fastener mechanism comprises of washers 34, a headless bolt 32 and a nut 30. The headless bolt 32 is fixed to the bottom end 29 of the frame 28. The guide 20 is fixed to the bar 40 by inserting the headless bolt 32 through the hole 46. Specifically, washers 34 are placed on either side of the bar 40 along the headless bolt 32 and are fastened in place with the nut 30. Alternatively, the fastener disposed at the bottom end 29 of the guide 20 may be any sort of fastening device that fastens the guide 20 on the handle bar 40, for example a clamp.

In the present embodiment, the user places spools S on the spindle 50 of the cart 70 and attaches the handle bar 40 possessing the guides 20 to the spindle 50. As the user pulls the wire W from the spool S it is threaded through the circular member disposed at the first end of the eyebolt 22 of the guide 20. Friction is created as the wire W is pulled from the spool S through the eyebolt 22. This friction helps slow the speed at which the spool S rotates on the spindle 50 and reduces the amount of excess wire W that may be expended and ultimately may become entangled. Though the guide 20 reduces the speed at which the wire W can be dispensed and the rotating motion of the spool S, the guide 20 nevertheless acquiesces to the direction of the user's pull. This acquiescence is made possible by the eyebolt 22 being rotatably mounted to the frame 28 by the ball bearing 26.

As an added feature, a plastic washer may be snapped into the circular member disposed at the first end of the eyebolt 22. The plastic washer would have a central hole through which the wire W is threaded in through to dispense it from the spool S. The central hole of the plastic washer would have a smaller diameter than the diameter of the circular member of the eyebolt 22 thereby reducing the space within which wire can move and providing further resistance to slow down the dispensation of the wire W.

As an alternative to the assembly 10, it would be sufficient to simply have an assembly that comprises just the handle bar 40 possessing the guide(s) 20. In this instance the handle bar 40 could be made to fit on any spindle on any sort of cart. A third embodiment would comprise the handle bar 40 and the spindle 50 as a unit with the guide(s) 20 being disposed on the bar 40, thereby foregoing the need of having the cart 70.

It is to be understood that the present invention is not limited to the embodiments described above, but encompasses any and all embodiments within the scope of the following claims.

I claim:

1. A wire spool guide assembly, comprising:
   a cart having at least one spindle;
   a handle bar connected to the at least one spindle;
   at least one wire spool guide disposed on the handle bar, the guide comprising:
      a support frame having a top end and a bottom end;
      a fastener disposed at the bottom end of the support frame;
      a ball bearing dimensioned and configured to rest within the top end of the support frame, the bearing having a central hole;
      a sleeve dimensioned and configured to rest within the central hole of the ball bearing, the sleeve comprising a shaft having an inner surface and an outer surface the inner surface being threaded forming a threaded central opening; and
      an eyebolt dimensioned and configured to rest within the threaded central opening of the sleeve.

2. The wire spool guide assembly of claim 1, wherein the shaft of the sleeve has a top end and a bottom end, the top end having a flat annular lip extending perpendicularly from the top end of the shaft, the shaft of the sleeve having a smooth outer surface.

3. The wire spool guide assembly according to claim 1, wherein the eyebolt comprises a shaft having a first end and a second end, the first end having a circular member, the second end being threaded and dimensioned and configured to rest within the threaded central opening of the sleeve.

4. The wire spool guide according to claim 1, wherein the handle bar is connected to the spindle by fasteners.

5. The wire spool guide according to claim 1, wherein the handle bar is connected to the spindle by setscrew collars.

6. A wire spool guide assembly, comprising:
   a handle bar;
   at least one wire spool guide disposed on the handle bar, the guide comprising:
      a support frame having a top end and a bottom end;
      a fastener disposed at the bottom end of the support frame;
      a ball bearing disposed at the top end of the support frame, the bearing having a central hole;
      a sleeve dimensioned and configured to rest within the central hole of the ball bearing, the sleeve comprising a shaft having an inner surface and an outer surface the inner surface being threaded forming a threaded central opening; and
      an eyebolt dimensioned and configured to rest within the threaded central opening of the sleeve.

7. The assembly of claim 6, wherein the shaft of the sleeve has a top end and a bottom end, the top end having a flat annular lip extending perpendicularly from the top end of the shaft, the shaft having a smooth outer surface.

8. The assembly of claim 6, wherein the eyebolt comprises a shaft having a first end and a second end, a circular member disposed at the first end of the shaft, the second end being threaded and dimensioned and configured to rest within the threaded central opening of the sleeve.

9. The assembly of claim 6, further comprising a spindle serving as a mounting point for the handle bar.

10. The assembly of claim 9, wherein the handle bar is connected to the spindle by setscrew collars.

11. The assembly of claim 9, wherein the handle bar is connected to the spindle by fasteners.

12. The assembly of claim 9, further comprising a cart, the spindle forming portions of the cart.

13. A wire spool guide, comprising:
   a support frame having a top end and a bottom end;
   a fastener disposed at the bottom end of the support frame;
   a ball bearing dimensioned and configured to rest within the top end of the support frame, the bearing having a central hole;
   a sleeve dimensioned and configured to rest within the central hole of the ball bearing, the sleeve comprising a shaft. having an inner surface and an outer surface the inner surface being threaded forming a threaded central opening; and
   an eyebolt dimensioned and configured to rest within the threaded central opening of the sleeve.

14. The guide of claim 13, wherein the shaft of the sleeve has a top end and a bottom end, the top end having a flat annular lip extending perpendicularly from the top end of the shaft, the shaft having a smooth outer surface.

15. The guide of claim 13, wherein the eyebolt comprises a shaft having a first end and a second end, the first end of the shaft having a circular member, the second end being threaded.

16. The guide of claim 13, further comprising a handle bar, the guide being disposed on the handle bar.

17. The guide of claim 16, further comprising a spindle, the spindle being connected to the handle bar by fasteners.

18. The guide of claim 16, further comprising a spindle, the spindle being connected to the handle bar by setscrew collars.

19. The guide of claim 16, further comprising a cart, the spindle forming portions of the cart.

* * * * *